No. 844,517. PATENTED FEB. 19, 1907.
L. HAAS.
ANIMAL TRAP.
APPLICATION FILED AUG. 9, 1906.
2 SHEETS—SHEET 1.
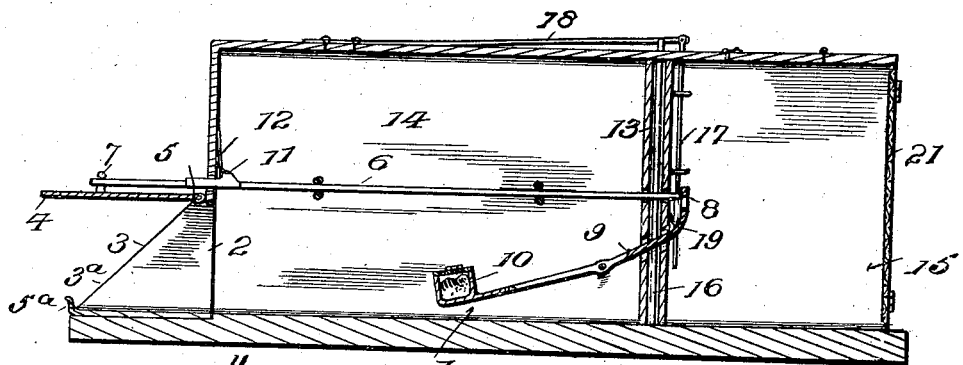
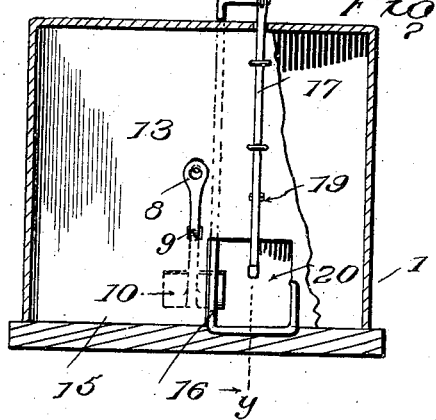
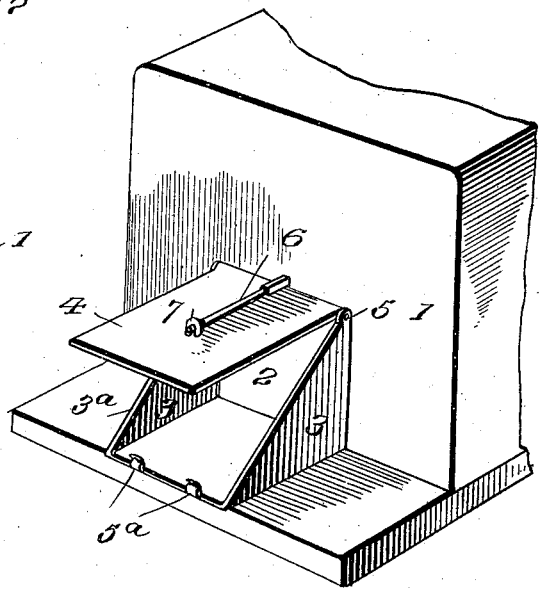
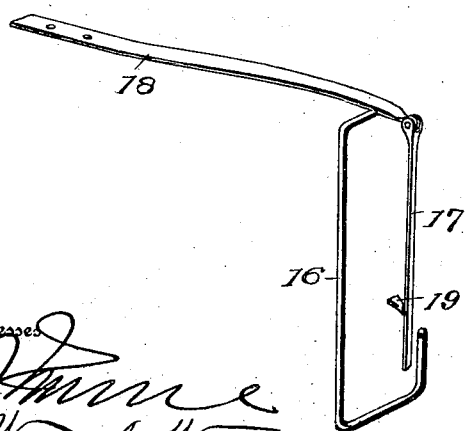
Witnesses
Inventor
L. Haas
By R. A. P. Lacey,
Attorneys
THE NORRIS PETERS CO., WASHINGTON, D. C.

No. 844,517. PATENTED FEB. 19, 1907.
L. HAAS.
ANIMAL TRAP.
APPLICATION FILED AUG. 9, 1906.
2 SHEETS—SHEET 2.
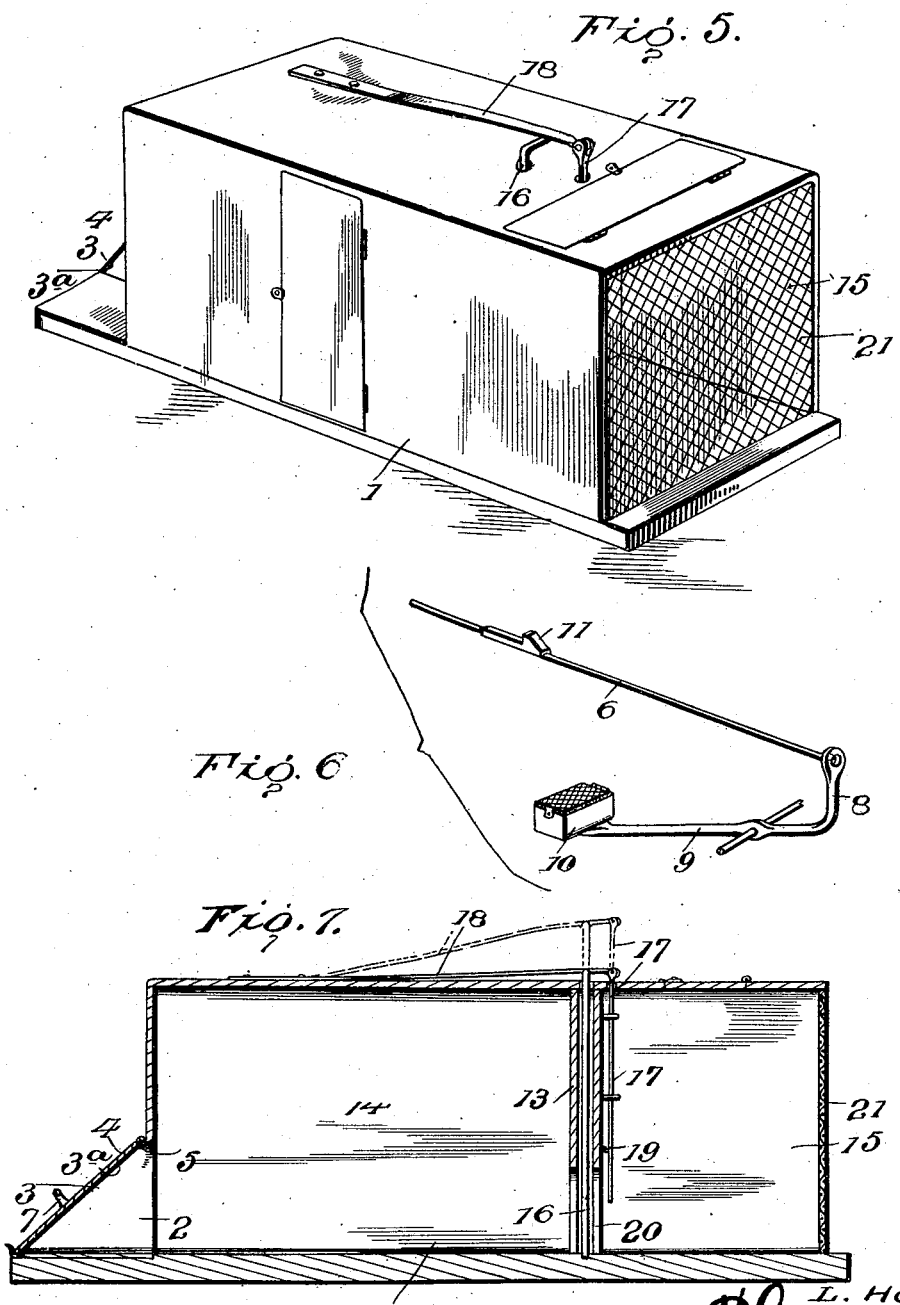

UNITED STATES PATENT OFFICE.

LAUNVILLE HAAS, OF COLUMBIA CITY, INDIANA.

ANIMAL-TRAP.

No. 844,517. Specification of Letters Patent. Patented Feb. 19, 1907.

Application filed August 9, 1906. Serial No. 329,925.

*To all whom it may concern:*

Be it known that I, LAUNVILLE HAAS, a citizen of the United States, residing at Columbia City, in the county of Whitley and State of Indiana, have invented certain new and useful Improvements in Animal-Traps, of which the following is a specification.

This invention consists of a novel form of animal-trap designed particularly for catching rodents, though it may be utilized as a means for entrapping birds or the like so far as the principle of construction and operation are concerned.

In the practical adaptation of the invention it is contemplated to provide a trap embodying a suitable inclosure divided into two compartments, into one of which the animal to be trapped is enticed by bait or similar means, the other one being so located as to tempt the animal to enter the same. Means are provided for killing the animal as he attempts to enter the second compartment of the trap.

For a full understanding of the invention and the merits thereof and also to acquire a knowledge of the details of construction of the means for effecting the result reference is to be had to the following description and accompanying drawings, in which—

Figure 1 is a vertical longitudinal sectional view of a trap embodying the invention. Fig. 2 is a vertical transverse section, the partitions being shown broken away. Fig. 3 is a broken perspective view looking toward the entrance of the trap. Fig. 4 is a perspective view of the spring, and choke and trip bars actuated thereby, with adjacent parts. Fig. 5 is a perspective view of the trap looking toward the rear end thereof. Fig. 6 is a perspective view of the longitudinal trip-bar and bait-lever arranged to engage the same. Fig. 7 is a sectional view on the line $y\ y$ of Fig. 2, dotted lines showing the position of the spring when the choke-bar has been operated.

Corresponding and like parts are referred to in the following description and indicated in all the views of the drawings by the same reference characters.

Specifically describing the invention, the numeral 1 designates the trap-body, which consists of a suitable inclosure or receptacle, preferably of somewhat rectangular form and provided at one end with an entrance 2, consisting of outwardly-projecting spaced sides 3, having inclined or sloping edges $3^a$. The entrance 2 is adapted to be closed by a door 4, one end portion of which is hinged at 5 to the adjacent end portion of the trap 1. The other free end portion of the door 4 is adapted to be engaged by catches $5^a$ at the lower portion of the entrance 2 when said door is in closed position. Of course when the door 4 is closed it rests upon the sloping edge portions of the sides 2 and is supported by said sides. Normally, however, when the trap 1 is open and ready for use the door 4 is held in a horizontal position by means of a sliding trip-rod 6, one end of which is adapted to move into a loop 7 on the outer side of the door 4, and the opposite end of which is movable through an opening in a vertical extension 8 of a pivoted bait-lever 9. The bait-lever 9 may be pivoted to a suitable cross-rod in the trap 1 and is provided with a bait-holder 10 at one end, the other end being formed with the extension 8 above mentioned. Intermediate of the ends of the trip-rod 6 is located a projection 11, engaged by a spring 12, which normally tends to force the rod 6 longitudinally toward the end of the trap opposite that at which the entrance 2 is located.

The trap 1 is separated into two compartments, as before premised, by means of a vertical partition 13, the compartments being indicated 14 and 15 and being described hereinafter as the first compartment 14 and the second compartment 15, respectively. The partition 13 is of any substantial nature and embodies, preferably, spaced portions in which operates a vertically-movable choke-bar 16. Both the part 16 and a vertical trip-bar 17 are secured at the upper extremities thereof to a spring 18, applied to the top of the trap and secured thereto at one end, the free end of the spring being attached to the parts 16 and 17, before mentioned. The normal tendency of the spring 18 is to pull upwardly upon the choke-bar 16 and the trip-bar 17. The choke-bar 16 consists, preferably, of a simple bar having the lower end thereof curved upwardly, while the trip-bar 17 also consists of a simple flexible bar the lower end portion of which is adapted to be engaged and held down by a small catch 19, said bar 17 being slidable on a side of partition 13. The curved lower end portion of the choke-bar 16 is adapted to operate across an opening 20, which is formed in the lower portion of the partition 13.

The above briefly describes the construction of the parts comprising the invention.

In operation when the trap is set, as shown in Fig. 2, the door 4 is in a horizontal position, being held up by engagement of the adjacent end of the trip-rod 6 with the loop 7. The opposite end of the trip-rod 6, however, is engaged with the upper end portion of the extension 8 of the bait-lever 9, and this extension prevents longitudinal movement of the trip-rod. Meanwhile the spring 18 is held down near the top of the trap by engagement of the trip-bar 17 with the catch 19, and of course the lower curved end portion of the choke-bar 16 is similarly held down, being located at the base of the opening 20 in the partition 13. The parts being arranged as above described, the animal or rodent will enter the first compartment 14 through the entrance 2, and, tampering with the bait-holder 10, the adjacent end of the lever 9 will be pressed downwardly, raising the extension 8 until the end of the rod 6 is in line with the opening in said extension, whereupon the rod will be forced longitudinally through this opening under the action of the spring 12, though operating with the projection 11. This movement of the rod 6 will disengage the same from the loop 7 on the door 4, and said door will fall or drop and will be locked closed by engagement therewith of the catches 5. The animal is thus entrapped in the first compartment 14, with the only means of egress therefrom as the opening 20. The end portion of the trap remote from the entrance 2 is made of foraminous material, such as screen-wire or the like, as shown at 21, and light of course penetrates to the compartment 15. Thus an animal entrapped in the compartment 14 will attempt to pass into the compartment 15 through the opening 20, as said compartment appears to be a means of egress from the trap. As soon, however, as the animal puts his head into the opening 20 it strikes the trip-bar 17, disengages said trip-bar from the catch 19, and this releases the spring 18, which latter immediately bounds upwardly, carrying the trip-bar 17 and the choke-bar 16 up. The lower curved end of the choke-bar 16 will engage with the animal and choke it to death. The operation of the trap is simple and can be relied upon to entice animals thereto and to effectively destroy the life of the animal after the same is entrapped.

It is to be understood that under certain conditions earth may be disposed on the bottom of the trap, so as to more readily entice animals to enter the same. Furthermore, the trip-bar 7 is made of material adapted to flex somewhat in order to disengage the same from the catch coöperating therewith. A door will be located on top of the trap to afford access to the compartment 15, while a similar door will be located at one side of the trap to afford access to the compartment 14, which is located nearer the entrance of the device.

Having thus described the invention, what is claimed as new is—

1. An animal-trap having a suitable entrance-opening, a door closing said entrance, a longitudinally-movable trip-rod engageably coöperating with the door to hold the same in open position, a spring applied to the body of the trap and coöperating with the trip-rod to normally throw the same out of coöperation with the door, and a bait-lever arranged to engage the trip-rod to hold the same in coöperation with the door, and movable to permit of release of the door from the trip-rod.

2. An animal-trap provided with a suitable entrance, a door for said entrance, a loop projecting from the door, a longitudinal trip-rod engaging with the loop aforesaid to hold the door in open position, a projection extending from said trip-rod between its ends, a spring secured to the body of the trap, and engaging the projection of the trip-rod and normally tending to disengage the latter from the loop, and a bait-lever pivoted to the trap and provided with an extension having an aperture through which the trip-rod is slidable, said lever being arranged to engage the trip-rod and hold the same in engagement with the loop, as specified.

3. An animal-trap comprising a trap-body or inclosure, a partition separating the same into first and second compartments, an entrance leading to the first compartment, a door for closing said entrance, a trip-rod connected with said door, a bait-lever connected with said trip-rod, the partition aforesaid being provided with an egress-opening leading from the first compartment to the second compartment, a choke-bar mounted on the partition aforesaid and adapted to operate across the egress-opening above mentioned, a trip-bar for holding the choke-bar in a predetermined position, a spring connected with the choke and trip bars aforesaid, and a catch adapted to engage the trip-bar, said trip-bar extending so as to project across the egress-opening in the partition.

In testimony whereof I affix my signature in presence of two witnesses.

LAUNVILLE HAAS. [L. S.]

Witnesses:
WILLIAM H. CONTEE,
JESSE MILLER.